J. SCHUETTE.
DEVICE FOR INSERTING RIVETS.
APPLICATION FILED FEB. 20, 1922.
1,422,381.
Patented July 11, 1922.
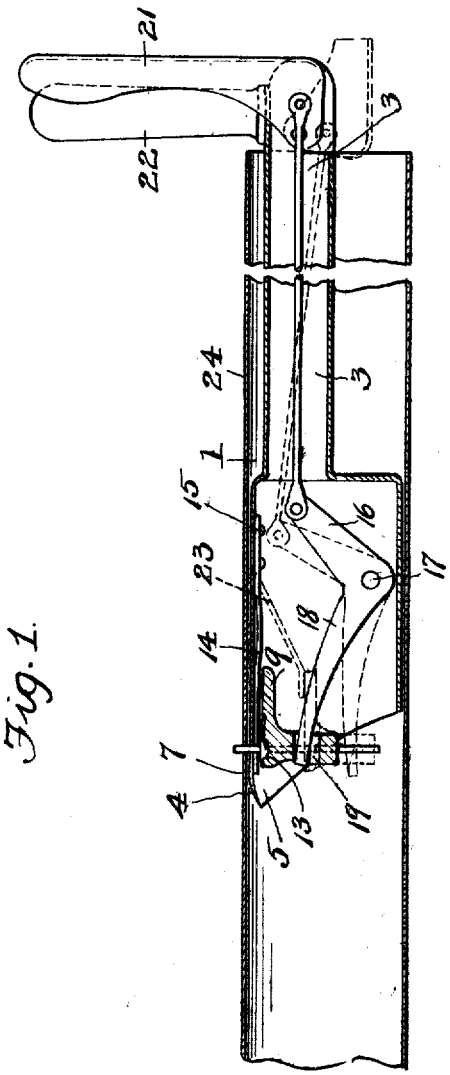
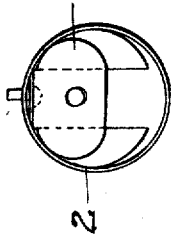
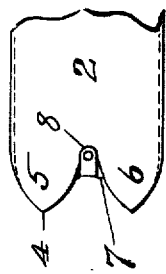
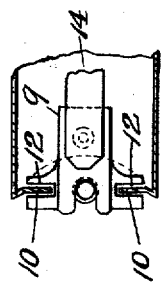
Inventor
Johann Schuette,
By Blackwood Bros.
Attorneys

UNITED STATES PATENT OFFICE.

JOHANN SCHUETTE, OF ZEESEN-KOENIGS-WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

DEVICE FOR INSERTING RIVETS.

1,422,381.     Specification of Letters Patent.     Patented July 11, 1922.

Original application filed April 25, 1919, Serial No. 292,767. Divided and this application filed February 20, 1922. Serial No. 537,665.

*To all whom it may concern:*

Be it known that I, JOHANN SCHUETTE, a citizen of the Republic of Germany, residing at Zeesen-Koenigs-Wusterhausen, near Berlin, Germany, have invented certain new and useful Improvements in Devices for Inserting Rivets (for which I have filed applications in Germany March 28, 1917, January 21, 1918, March 20, 1918, April 17, 1918, and April 24, 1918); and I do hereby declare the following to be a full, clear, and exact description of the invention, such as will enable others skilled in the art to which it pertains to make and use the same, this application being a division from my application for a patent on improvements in pipe joints filed April 25th, 1919, bearing Serial Number 292,767.

My invention relates to improvements in devices for inserting or placing rivets in a pipe or hollow girder in such position as to permit the outer end of the inserted rivet to be upset or riveted against the material being joined or riveted, and more particularly to a tool adapted for use in placing rivets in previously-formed holes in pipes or girders for forming joints between them; such as the joining of the tubular ties or girders for airships of the rigid type.

In joining two or more pipes, or in riveting the braces to the pipe ties on the inside, it is very tedious and difficult to place the rivets in the respective holes when the pipes are of small diameter and the rivets cannot be introduced directly by hand.

The object of my invention is to provide a tool adapted to receive and hold a rivet, and, when inserted or introduced into a pipe, to place the rivet into previously formed registering holes in the pipes to be joined.

These objects are attained by the apparatus shown in the accompanying drawings, in which Fig. 1 is a side view, partly in section, of the tool as it appears when applying a rivet through a hole in a pipe. Fig. 2 is a horizontal sectional view taken just above the leaf spring 14 in Fig. 1. Fig. 3 is a top plan view of the front end of the tool, and Fig. 4 is a front view of the tool and pipe; similar reference characters denoting similar parts throughout the several views.

The rivet-carrying and inserting tool 1, is provided with a bifurcated or fork-like head 2, having a rearwardly extending tubular portion 3, smaller in diameter than the head 2 and a forwardly extending portion 4, which comprises two downwardly curved ears or points, 5 and 6, with a substantially V-shaped tapering opening 7 between them, which tapers rearwardly to the point 8, where it is of the same size as the rivet hole, and is for the purpose of receiving the shank of the rivet.

A slide 9 is provided, which is reciprocatable vertically in the outer end of the head 2, its motion being constrained by guides 10 in the head and vertical slots 12 in the slide, and is provided with a semi-circular depression 13 in which the head of the rivet is mounted or seated. At 14 is a leaf spring, secured to the interior surface of the upper wall of the head 2 by means of rivet 15, or other suitable means, the bifurcated outer end of this leaf spring 14 embracing the shank of the rivet and holding it in place.

The slide 9 is operated and slid vertically by means of a bell-crank lever 16, pivoted on a pin 17, this pin 17 extending transversely on the head 2. The forward leg or member 18 of the bell-crank lever is inserted in a slot 19, in the slide 9, while the other leg or member 20 of the bell-crank lever is pivotally connected to a pivoted hand-lever 21, pivoted upon the rearwardly extending tubular portion 3. At 22 is a stationary handle, also mounted on the tubular extension 3.

In order to retain the slide 9 in its normal position at the lower end of the slots 12, when not being held up by the lever 16, a leaf spring 23 is secured to the upper portion of the inside wall of the head 2, and its free end bears on top of the slide 9.

At 24 is a pipe or tubular girder within which the tool is shown as having just inserted a rivet.

In the operation of the apparatus a rivet is placed on the slide 9 with its head in the depression therein, the rivet being held with its shank in a vertical position by means of the leaf spring 14, the shank of the rivet passing through the bifurcated outer end of the head 2. The bell-crank lever 16 is then operated and the leg 18 moves upward, and in turn moves the slide 9, and thus causes the rivet to be inserted in the rivet hole provided in the pipe. After the operation of inserting the rivet is effected, the slide 9 and other parts are permitted to assume their original position by the action of the spring 23.

I claim:

1. In a portable tool for inserting rivets, adapted to be manually inserted within the article being riveted, rivet positioning means, rivet supporting and inserting means, means for holding the rivet on said supporting and inserting means, means for adjusting said holding means to register the rivet with the hole in which it is to be inserted and means for moving the rivet supporting and inserting means to insert the rivet in said hole.

2. In a portable tool for inserting rivets, adapted to be manually inserted within the article being riveted, a supporting member, a reciprocable rivet carrying member, means adapted to automatically move and resiliently hold said rivet carrying member normally in one direction of its movement and means adapted to move said rivet carrying member in the other direction of its movement against the action of said resilient moving and holding means.

3. In a portable tool for inserting rivets, adapted to be manually inserted within the article being riveted, a supporting member, a reciprocable rivet carrying member, means adapted to temporarily hold a rivet on said rivet carrying member, means adapted to register the rivet with the hole into which it is to be inserted, means adapted to automatically move and resiliently hold said rivet carrying member normally in one direction of its movement and means adapted to move said rivet carrying member in the other direction of its movement against the action of said resilient moving and holding means.

4. In a portable tool for inserting rivets, adapted to be manually inserted within the article being riveted, the combination of a supporting member with a slidable member constrained to move at an angle with the supporting member, said supporting member being provided with resilient means for holding a rivet in a position parallel to the movement of said slidable member.

5. In a portable tool for inserting rivets, adapted to be manually inserted within the article being riveted, the combination of a tubular supporting member, with a slidable member, constrained to move at an angle with the axis of the tubular supporting member, and with means for converting the motion from a direction parallel to the axis of the tubular supporting member into a motion parallel to the motion imparted to the rivet.

6. In a portable tool for inserting rivets, adapted to be manually inserted within the article being riveted, the combination of a tubular supporting member, with a slidable member, constrained to move at an angle with the axis of the tubular supporting member, said supporting member being provided with means for holding a rivet in a position parallel to the movement of the said slidable member and means for imparting motion to said slidable member.

7. In a portable tool for inserting rivets, adapted to be manually inserted within the article being riveted, the combination of a tubular supporting member, with a slidable member, constrained to move in a direction at an angle with the axis of said tubular supporting member and a bell crank connecting rod and hand lever for the purpose of imparting motion to said slidable member.

8. In a portable tool for inserting rivets, adapted to be manually inserted within the article being riveted, the combination of a supporting member insertable and movable longitudinally in the article being riveted, with a slidable member constrained to move at an angle with the supporting member, said supporting member being provided with resilient means for holding a rivet in a position parallel to the movement of said slidable member.

In testimony whereof I have affixed my signature.

JOHANN SCHUETTE.